United States Patent Office 2,838,449
Patented June 10, 1958

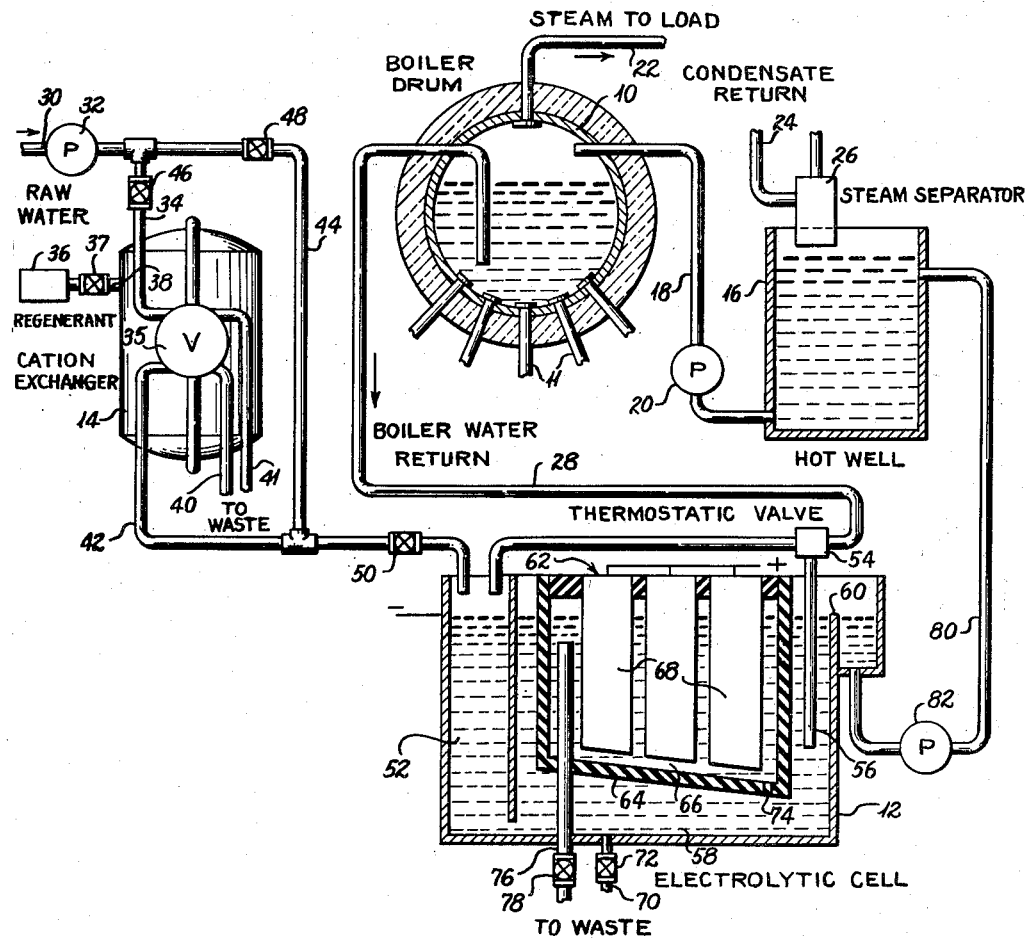

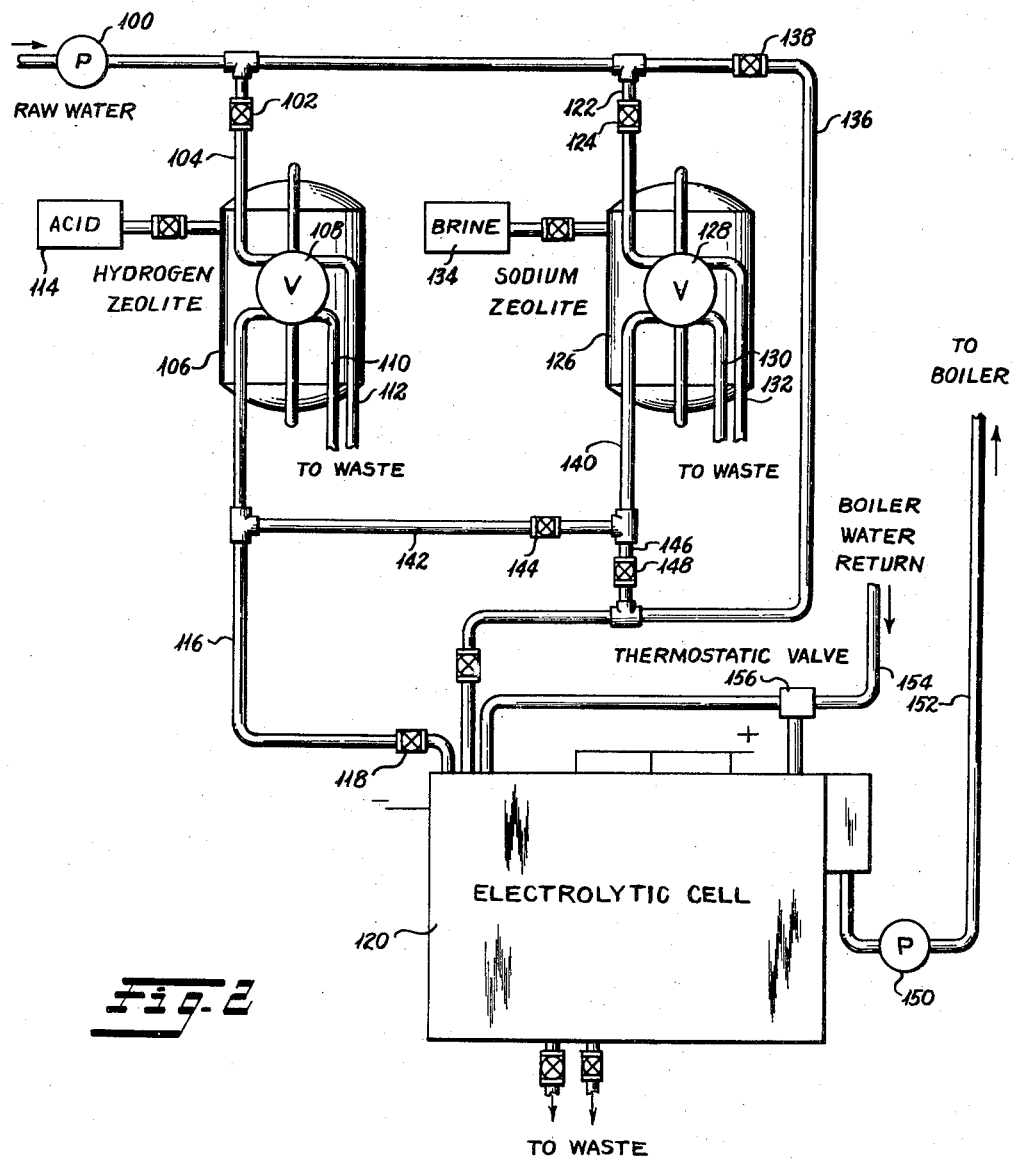

2,838,449
METHOD AND APPARATUS FOR WATER TREATING

Robert E. Briggs, Azusa, Calif.

Application July 18, 1955, Serial No. 522,808

8 Claims. (Cl. 204—151)

This invention relates to a method and apparatus for treating water utilizing the combined effects of ion exchange and electrolytic action, and more particularly, to such method and appartus for treating boiler feed water as to prevent the formation of adherent scale in boilers when the water supply contains scale-producing materials, and to remove materials causing corrosion of the interior surfaces of boilers. The invention is particularly applicable to treatment of waters low in carbonate hardness but containing a substantial mount of non-carbonate hardness, and also to treatment of waters of low alkali metal content. In its broader aspects, it provides a method and means for effecting economies in the treatment of many types of waters, particularly for small boiler installations, and, in general, for effecting the softening and/or demineralization of waters or other liquids for various purposes. The present application is a continuation-in-part of my co-pending application Ser. No. 361,251, filed June 12, 1953, now abandoned, which in turn is a continuation-in-part of my application Serial Number 163,936, which on June 22, 1954, matured into Patent 2,681,885.

Raw waters available for boiler supply usually contain substantial amounts of hardness constituents, which vary in quantity and composition depending upon the source of the water. Upon concentration of the hardness-producing constituents by evaporation of the water, the hardness-producing materials are precipitated and are deposited as scale on the heated surfaces in contact with the water. Polyvalent metals, primarily calcium and magnesium, may be present in the raw water in the form of compounds providing temporary hardness, i. e. as bicarbonates, and/or as compounds providing permanent hardness, i. e. sulfates, chlorides or nitrates, the latter also being referred to as non-carbonate hardness. Usually both carbonate and non-carbonate hardness are present. All of these compounds tend to form adherent coatings on the surfaces of the boiler, the bicarbonates present being converted into carbonates due to the heating of the boiler feed water. In some cases, silica also may be present in substantial amounts in the raw water, so as to cause deposition of adherent scales containing silica. While the chloride and nitrate ions may not enter into scale formation, such ions, as well as sulfate ions in the boiler feed water, may cause corrosion. Dissolved oxygen and carbon dioxide also cause corrosion problems. Alkali metal compounds, particularly sodium compounds, are usually present in a quantity which also varies depending upon the source of the raw water, but, in general, these compounds cause no problems.

In accordance with the invention disclosed in my aforementioned application, S. N. 361,251, and Patent 2,681,885, the incoming raw water is subjected to cathodic treatment in a two-compartment diaphragm-type electrolytic cell. Treatment of the raw water in the electrolytic cell causes the water being treated to become alkaline through the production of soluble alkali metal hydroxides. This results in precipitation of magnesium and calcium compounds in the alkaline catholyte. Calcium precipitates in the form of calcium carbonate at a pH of approximately 9.5 to 10.5, and magnesium precipitates as magnesium hydroxide at a pH of approximately 11.0 to 11.5. Bicarbonates are converted to carbonates in the alkaline catholyte to further the precipitation of calcium carbonate. At the same time corrosion-causing materials, such as sulfates and chlorides are concentrated in the anode compartment of the cell, and are discharged from the system. A portion of the silica which is present may be removed with the precipitate formed, while the remaining silica is maintained in solution in the boiler water by the alkalinity in the catholyte effluent. The reaction in the electrolytic cell further includes the release of dissolved or occluded gases, such as carbon dioxide and oxygen, due to the scrubbing effect of the hydrogen released at the cathode and other electrochemical effects in that region. Excess bicarbonate ions are also reduced by migration into the anolyte waste solution. The waste from the cell is maintained at a low value by feeding the anode compartment with alkaline water and precipitate from the cathode compartment. The remaining precipitate formed in the cathode compartment is settled or otherwise separated from the treated water. While the water delivered from the water-treating system to the boiler is alkaline, such alkalinity has no deleterious effect on the operation of the boiler. Very little precipitation of sulfate takes place in the boiler and any precipitate which may form is in a flocculent condition which remains in suspension so that no substantial amount of scale is deposited.

An important feature of the process described in my aforementioned application and patent is the return of concentrated boiler water from the boiler to the electrolytic treating system. This provides a means for maintaining the high alkalinity of the water in the cell and further, due to maintaining a high concentration of electrolytes in the water fed to the cathode compartment, increases the average conductivity of the catholyte, thereby reducing power consumption. The return of the hot concentrated boiler water to the electrolytic cell also has the advantage of maintaining a relatively high temperature in the cell to further increase the conductivity of the electrolytes and decrease the electric power necessary for adequate water treatment. This method of water treatment has proved to be very desirable, particularly for large installations.

In certain situations, the water to be treated may contain a substantial amount of hardness constituents in the form of permanent hardness and a relatively low content of temporary or bicarbonate hardness. Some waters may not only be low in bicarbonate content, but also have a low alkali-metal content. For proper operation of the electrolytic cell in order to precipitate calcium carbonate and magnesium hydroxide, and in order to raise the alkalinity of the catholyte sufficiently high to maintain silica in solution, it has been found that the alkali metal content in the raw or make-up water should be at least about 50 parts per million, and that the bicarbonate content should be in excess of the total hardness. For proper treatment of waters deficient in one or more of these constituents, it would appear advisable to pretreat the water by addition of chemical supplements. Thus, a chemical adjustment may be made by adding soda ash or other sodium compounds to the raw water. This, however, raises the total dissolved solids content of the water and increases the load on the electrolytic cell.

It has now been discovered that the operation of the electrolytic cell process on waters of the type described is greatly improved by flowing at least a portion of the water to be treated through a cation exchange system prior to its introduction into the cathode compartment of the electrolytic cell. Thus, by utilizing a cation exchange unit ahead of the electrolytic cell, to exchange sodium ion for at least a portion of the polyvalent metal content, sufficient sodium is added to provide the necessary alkalinity in the subsequent step, and the calcium-to-bicarbonate ratio is adjusted sufficinetly to provide precipitation of calcium in the cell as calcium carbonate. The pretreating step brings about the desired addition of sodium ions while at the same time at least partially reducing the hardness constituents of the water. Thus, the very step which adds sodium also contributes to the softening operation, without increasing the total dissolved solids.

In one embodiment of the invention, all of the supply water is directed first to a cation exchanger operating on a sodium cycle and thence to the cathode compartment of a two-compartment electrolytic cell. The effluent from said cathode compartment will be substantially free of suspended solids, and may be directed to the boiler supply tank or to the hot well. When operating in this manner, the effluent from the sodium cation exchanger will usually have a pH of between 7.5 and 8.5, and will have substantially all of the polyvalent metal ions replaced by sodium ions. The effluent, while substantially a soft water, is still not suitable for boiler water use due to the acid ion content, corrosive gas content, and silica content. During passage through the cathode compartment of the electrolytic cell, the pH is raised appreciably, preferably to a value of about 10.5 to bring about precipitation of any remaining polyvalent metal ions and completion of the softening process, and to maintain silica in solution. Treatment in the cathode compartment also effects release of the dissolved or occluded gases, such as $CO_2$ and $O_2$, and removal of the acid components, such as sulfate, chloride, and bicarbonate ions by passage into the anolyte waste solution. The reactions in the cathode compartment of the cell are more pronounced when hot boiler water is recycled to the cell in the manner disclosed in my aforementioned Patent, 2,681,885, and my co-pending application, S. N. 361,251. The process wherein all of the supply water is directed to a sodium ion exchanger before introduction into the electrolytic cell is specially applicable to small-demand systems, to installations where the percentage of condensate returned to the system is not appreciable, and where it is desired to avoid clarification and filtration units for removal of suspended solids.

For certain installations involving high make-up demand, it has been found more ecenomical to divert only a portion of the water supply to the cation exchange unit with the remainder going directly to the electrolytic cell. The percentage of supply water going to the cation exchanger may be predetermined by analysis of the raw water and contemplated usage, and may vary from 100% to less than 25%. The length of the exhaustion cycle for the cation exchange material is, of course, increased by this percentage diversion. In such operation, the primary objective is adjustment of total hardness to bicarbonate ratio by use of the cation exchanger to remove substantially only that part of the total hardness that could not otherwise be completely removed by precipitation in the electrolytic cell.

This treatment also adds a corresponding portion of sodium to the make-up waters and thereby ensures the presence of sufficient sodium to raise the pH in the cell to the precipitation point of magnesium in hydroxide form, and for maintaining a sufficiently high pH in the cell to keep silica in solution. For this latter purpose, pH should be maintained above about 10.2. The partial pretreatment therefore may be utilized with waters low in bicarbonate content but sufficiently high in sodium, or with waters low in both of these constituents.

It will further be recognized that the diversion of only a portion of the make-up demand to the sodium ion exchanger provides less total dissolved solids in the electrolytic cell effluent than in the instance when 100% sodium ion exchange treatment precedes the electrolytic cell, since in the partial treatment combination hardness components are precipitated in the cell, whereas in the total pretreatment combination substantially all of the hardness components are replaced with sodium which remains in solution as sodium hydroxide. Thus, the diversion of only a portion of the make-up demand to the ion exchange unit provides for a lower percentage of blowdown to keep the total dissolved solids in the boiler drum within prescribed limits, than when 100% ion exchange treatment precedes the electrolytic cell.

Where only a portion of the water is diverted to the cation exchange unit and the hardness components are precipitated in the electrolytic cell, clarification of the catholyte mixture in the cell may be desirable. As in my Patent No. 2,681,885 and co-pending application S. N. 361,251, the electrolytic cell itself may be provided with a settling tank. It will be understood, however, that other types of cells, such as described in my Patent 2,546,254, may be utilized, provided the volume in the cathode compartment is sufficiently in excess of the volume of the anode compartment. It has been found that by providing a catholyte compartment of sufficient size for a retention time of 30 to 60 mintues to be maintained in that compartment, substantially complete reaction is effected, and the settling of the precipitate within that zone is advantageously promoted. The volume of the cathode compartment may suitably be ten to twenty times the volume of the anode compartment in order to obtain the reaction time desired for a specific situation, depending somewhat on the proportion of cation-exchange-treated water introduced into the cell, and upon the nature of the raw water supply. It will be understood, of course, that further settling of suspended solids may be effected by utilizing separate settling tanks and filter units, but such treatment will usually not be required to maintain a workable boiler feed treating system.

In a further aspect of the present invention, all of the supply water may be directed through a cation exchange unit operating on the hydrogen cycle before subjecting it to electrolytic cell influence. Such treatment removes alkali metal ions as well as hardness constituents, and also substantially completely removes the bicarbonate constituent through $CO_2$ evolution. Further treatment in the electrolytic cell becomes one primarily of removal of acid ions and pH adjustment. By this method, a substantially completely demineralized neutral water may be obtained. This method of treatment may be utilized for boiler water treatment when the raw water is low in total hardness and substantially high in sodium bicarbonate alkalinity. It is contemplated, however, that combined treatment of liquids with cation exchange material operating on the hydrogen cycle and followed by electrolytic cell treatment may be utilized for providing a water in any process usage where water of a low mineral content is desired.

In accordance with another aspect of the present invention, the combined effects of electrolytic cell treatment and cation exchange treatment may be realized by utilizing both a hydrogen ion exchange material and sodium ion exchange material. Thus, a hydrogen ion exchange unit and a sodium ion exchange unit may be operated in parallel, in an arrangement conventionally referred to as "split treatment" or in partial series parallel for pretreatment of the electrolytic cell influent. The parallel streams from the two ion exchange units may be either wholly or partially brought into confluence prior to introduction into the electrolytic ell. The hydrogen ion exchange unit serves as means for substantially reducing the sodium constituent as well as the hardness components, and for complete removal of bicarbonate constituent for that portion of the diverted water. The sodium ion exchange unit serves primarily as a means for hardness reduction at the same time introducing sodium ion in that portion of the diverted water. By proper proportioning of the streams of raw water through the two units a water can be produced upon which the optimum effect of electrolytic cell treatment for a particular purpose may be realized.

The ion exchange materials utilized by the present invention for operation in the sodium cycle may comprise any of the well known materials which will exchange sodium ions for calcium and magnesium ions, and which, when exhausted, may be readily regenerated by treatment with sodium salt brine. Thus, the sodium ion exchange unit may utilize natural inorganic zeolites, such as greensand or glauconite; synthetic inorganic zeolites such as sodium aluminum silicate; carbonaceous zeolites, such as sulfonated coal, peat, or lignite; as well as the more recently developed synthetic organic-resin zeolites, such as the carboxylic acid resins, sulfonated resins, and the like. The carbonaceous and resinous zeolites are not dissolved by acids, and hence may be regenerated by them to provide hydrogen instead of sodium. These materials so treated may be utilized for hydrogen ion exchange in the present process. For convenience, the sodium ion exchange materials, whether inorganic or organic, are referred to herein as sodium zeolites, and the hydrogen ion exchange materials are referred to herein as hydrogen zeolites. The hydrogen zeolite units are generally similar to sodium zeolite units, except that acid-resistant materials are utilized in the piping and tanks.

It will be understood that the ion exchange treatment employed herein may utilize fixed-bed technique employing a pair of units in alternate flow operation, or may employ a continuous technique involving moving-bed operations, or other known techniques. In each instance, the ion exchange treatment will involve a flow period, backwash period, regenerating period, and rinse period.

The principal object of the present invention is to provide an improved process and apparatus for chemically and electrolytically treating liquids containing dissolved electrolytes to thereby adjust said electrolyte content.

Another object of the invention is to provide an improved process and apparatus for chemically and electrolytically treating boiler feed water to remove the scale-forming materials therefrom.

Another object of the invention is to provide a method and apparatus for chemically and electrolytically treating boiler feed water to remove both scale-forming materials and corrosion-producing materials therefrom.

Another object of the invention is to provide a method for electrolytically treating water, wherein the water supplied to the cathode compartment of an electrolytic cell is provided by cation exchange pretreatment with sufficient alkalinity-producing cations to provide a high alkalinity in passage through said cathode compartment.

A further object of the invention is to provide a method for electrolytically softening water, wherein the hard water being fed into the electrolytic cell is pretreated by ion exchange to adjust the polyvalent metal to bicarbonate ratio to bring about an efficient precipitation of hardness components under the action of the electrolytic cell.

A further object of the invention is to provide a method for electrolytically treating water, wherein the total dissolved solids in the effluent from such electrolytic cell is controlled by at least partial pretreatment of the cell influent with cation exchange material.

A further object of the invention is to provide a method for electrolytically treating water low in alkali metal ions and bicarbonate content, wherein a portion of the influent to such electrolytic cell is diverted to ion exchange treatment in such proportions that the confluent mixture in the cell has both sufficient bicarbonate- and alkalinity-producing constituents to effect softening, and pH adjustment in said cell.

Another object of the invention is to provide a method for treating water by a combination of hydrogen ion exchange treatment, sodium ion exchange treatment, and electrolytic cell treatment, whereby the resulting effluent is a softened water having a relatively low dissolved solids content.

These and other objects and advantages of the invention will become apparent from the following description taken in conjunction with the accompanying drawings, in which:

Fig. 1 is a schematic flow diagram of a boiler system employing a cation exchange unit and electrolytic cell for treatment of boiler supply water in accordance with one embodiment of the invention; and Fig. 2 is a schematic flow diagram of a boiler water treating system employing both a sodium ion exchange unit and a hydrogen ion exchange unit in combination with an electrolytic cell in accordance with a further embodiment of the invention.

Referring now to Fig. 1 of the drawings, the water-treating system is shown in a combination including a boiler drum 10, an electrolytic cell 12, a cation exchange unit 14, and a boiler supply hot well 16. The details of the boiler are not a part of the present invention, and may be of any desired type. The drum 10, for example, may be the accumulator or steam drum of a water tube boiler having a plurality of water pipes 11 connected at their upper ends to the drum 10. The boiler water make-up supply from the hot well 16 is introduced into the drum 10 through a pipe 18 by means of a pump 20. Steam generated by the boiler may be withdrawn by means of pipe 22 for any suitable use, and, if any condensate is recovered, it may be returned by means of a condensate return pipe 24 through a steam separator 26 to the hot well 16. The drum 10 is further provided with a pipe 28 for either continuous or periodic boiler blowdown.

Raw water for the boiler make-up supply is supplied through a pipe 30 by means of a pump 32 and pipe 34 to the cation exchange unit 14, which, in accordance with the invention, may contain either a sodium zeolite or a hydrogen zeolite, and may be operated on either a sodium cycle or a hydrogen cycle, depending upon the analysis of the raw water and quality of the water desired. It will be understood that for fixed-bed operation, as illustrated, a pair of cation exchange units 14 would be utilized, so that one may be operated on a flow cycle while the other is being backwashed, regenerated, and rinsed. The cation exchange unit 14 is provided with a multiple action valve 35 for placing the exchanger in exchange or flow condition, backwash condition, regenerating condition, rinse condition, or standby condition, as necessary. A suitable regenerant, which may be salt brine where the cation exchange unit is operated on the sodium cycle, or a dilute acid where the cation exchange unit is operated on the hydrogen cycle, is supplied to the exchanger 14 from a tank 36 through a control valve 37 and a pipe 38. Pipes 40 and 41, controlled by valve 35, permit passage of backwash water, exhausted regenerant, and rinse water, to waste. The ion-exchange-treated water flows from the exchanger unit 14 through pipe 42. The raw water supply pipe 30 is also connected to a bypass pipe 44, whereby any desired amount of the raw water may be diverted around the ion exchange unit 14, and blended with the treated water in pipe 42. Valves 46 and 48 control the proportioning of the quantity of water by-passing the ion exchange unit.

The output of the cation exchange unit 14 along with any bypassed raw water from pipe 44 is delivered through a control valve 50 to a mixing compartment 52 of the electrolytic cell 12. It will be understood that the control valve 50 may be of the automatic type which may be responsive to the make-up water demand of the boiler.

Concentrated boiler water from boiler water return pipe 28 is also delivered to the mixing compartment 52 of cell 12 through a thermostatic valve 54 having a thermostatic element 56 in contact with the water in the electrolytic cell 12. Thus, the supply of boiler water return may be controlled so as to maintain a desired operating temperature within the electrolytic cell. The operating temperature of the cell may be conveniently maintained in a range of 80° to 160° F. whereby the maximum conductivity of the electrolytes is attained. The concentrated boiler water is highly alkaline and raises the alkalinity of the mixture in the mixing compartment 52 and in the catholyte effluent. It will be understood that the pretreatment combination of cation exchange treatment and electrolytic cell treatment may be employed without recycling of boiler water, but that the cell efficiency is increased by the recycling feature. The mixture of pretreated make-up water and boiler water now flows from compartment 52 into the cathode compartment 58, and through this compartment over a weir 60.

The electrolytic cell 12 is further provided with an electrode and diaphragm structure indicated generally by the reference numeral 62, which may be inserted or lifted bodily from the cathode compartment 58. The structure 62 has a frame 64 of insulating or poorly-conducting material supporting a diaphragm (not shown) and providing with such diaphragm an anode compartment 66 containing a plurality of anodes 68. Further details of suitable cell structure may be ascertained by reference to my patents, Nos. 2,546,254 and 2,681,885. Where hardness components are precipitated by the electrolytic action it is preferred that the volume of the cathode compartment 58 be about 10 to 20 times that of the anode compartment, to provide a suitable retention time for coagulation and settling of solids.

During its flow through cathode compartment 58, the water is subjected to cathodic treatment, which raises its alkalinity through production of sodium hydroxide, and thereby causes precipitation of any hardness components not removed in the cation exchange unit 14. The electrolytic treatment also causes the evolution of occluded oxygen and carbon dioxide. Any precipitate which tends to collect in the bottom of the cell 12 may be withdrawn from time to time through pipe 70 by opening valve 72.

The frame 64 of anode compartment 66 is provided with an orifice 74 opening into the cathode compartment. The anolyte is supplied to the anode compartment 66 through the orifice 74, and anolyte effluent is discharged from compartment 66 through a pipe 76 provided with an adjustable valve 78. A portion of any alkaline precipitate formed in the cathode compartment 58 is drawn into the anode compartment 66 through orifice 74 along with the alkaline water from the cathode compartment. Such precipitate is dissolved in the acid anolyte and in conjunction with the alkaline water from the cathode compartment reduces the rate at which the anolyte becomes acidic and thus reduces the amount of anode waste. In general, the pH of the anolyte should not be allowed to fall below approximately 2, where it is desired to maintain a sufficiently high alkalinity in the catholyte to precipitate magnesium hydroxide. Where magnesium has been previously removed, the anolyte may be permitted to become somewhat more acidic.

Treated water from the cathode compartment 58, overflowing weir 60, is delivered through a pipe 80 by means of pump 82 to the hot well 16. Settling tanks and/or filter units may be provided between the cell 12 and hot well 16, but usually are not necessary, particularly if the cathode compartment 58 is of sufficient volume to provide the necessary residence time for settling out of solids. Filters and clarifying tanks, of course, are not necessary where the major portion of the hardness constituents have been removed in the cation exchange unit.

Referring now to Fig. 2 of the drawings, there is shown a treating system which includes both sodium zeolite and hydrogen zeolite units in combination with the electrolytic cell. The raw water supply delivered by a pump 100 may be passed through valve 102 and pipe 104 into a hydrogen zeolite unit 106, which is provided with a multiple control valve 108, waste pipes 110 and 112, and acid regenerant supply tank 114, as previously described. Effluent from this unit, which has had both alkali metal and hardness constituents replaced by hydrogen to produce acids, passes through line 116 and supply control valve 118 into the mixing compartment of electrolytic cell 120, which may be of the same type shown in Fig. 1. All of the raw water may be passed through the unit 106 or a portion of the raw water may be diverted around this unit through line 122 and valve 124 into a sodium zeolite unit 126, provided with multiple-control valve 128, waste pipes 130 and 132, and sodium regenerant supply tank 134, and operating in the same manner as described in connection with Fig. 1. A further portion of the raw water may be diverted, if desired, around both hydrogen zeolite unit 106 and sodium zeolite unit 126, by means of bypass line 136 and control valve 138. Treated effluent from the sodium zeolite exchange unit 126 may be passed through pipe 140 and either wholly or in part through pipe 142 and valve 144 for blending with the acid effluent from hydrogen zeolite unit 106 in pipeline 116, with any remaining portion passing through pipeline 146 and valve 148 directly into the mixing compartment of the electrolytic cell. When the raw water is equally divided between the two cation exchange units 106 and 126, and all of the effluent from the sodium zeolite unit is passed through pipe 142, the valve 144 being open and valve 148 closed, the confluent mixture mingled in the pipeline 116 will have a pH of approximately 6.5. The hardness constituents will have been substantially removed, having been replaced by hydrogen in that portion passing through the hydrogen zeolite unit 106 and by sodium in that portion of the water passing through the sodium zeolite unit 126, and the bicarbonate alkalinity will have been reduced to a low percentage.

Instead of commingling all of the sodium zeolite effluent with the effluent from the hydrogen zeolite unit, a portion of the effluent from the sodium zeolite may be passed directly to the electrolytic cell through pipeline 146 and control valve 148. Thus, when approximately one-half of the effluent from the sodium zeolite unit 126 is passed through the pipeline 146 to the electrolytic cell, and the other half passed through line 142 and commingled with the effluent from the hydrogen zeolite unit 106 in pipeline 116, the confluent mixture in pipeline 116 will have a pH of approximately 3.7. The acid condition in pipeline 116 insures a rapid breakdown of the carbonate constituents in the sodium zeolite effluent and the immediate release of carbon dioxide gas. The final blend in the mixing compartment of the electrolytic cell, however, will be approximately pH 6.5. The total dissolved solids content in the treated water may be controlled by removing part of the cation content of the water in the hydrogen zeolite exchanger 106 or by diverting a part of the raw water around the zeolite units through pipe 136, and directly into the electrolytic cell for precipitation of hardness components therein as previously described, or by a combination of such expedients. It is usually desirable to pass a sufficient portion of the raw water through the sodium zeolite unit 126 to insure the formation of a catholytic solution in the electrolytic cell of a pH above about 10.2. The effluent from the electrolytic cell at this pH is then delivered by pump 150 through pipe 152 to the hot well of the boiler, as illustrated in Fig. 1. Hot concentrated boiler water may also be returned to the mixing compartment of cell 120 through pipe 154, under the control of thermostatic valve 156.

In order to further illustrate the invention, a number of tests were run, utilized no pretreatment of the raw water before electrolytic treatment in one test, and, in further tests, utilizing various combinations of arrangements of cation exchange pretreatment and electrolytic cell treatment as provided by the systems shown in Figs. 1 and 2. For these tests a raw water was selected which had both a lower sodium content than necessary to provide the desired sodium hydroxide in the catholyte of the electrolytic cell, and a lower bicarbonate content than necessary to bring about the desired precipitation of hardness components in the alkaline catholyte. This water came from two supply wells delivered to a common supply line. The total dissolved solids, hardness, and sodium content were approximately the same for both wells, but the bicarbonate content varied between 160 and 185 p. p. m. An average analysis of the raw water showed it to have a pH of 7.5, a hardness (calculated as $CaCO_3$) of 230 p. p. m., a bicarbonate content of 180 p. p. m., a sodium content of 30 p. p. m., and a total dissolved solids content of 395 p. p. m. Thus, the sodium content was lower than the desired 50 p. p. m. required to maintain the necessary alkalinity in the electrolytic cell, and the bicarbonate content was less than the total hardness, and therefore less than that required to precipitate hardness components.

For general data, the electrolytic cell was operated as a cold process, and the cell effluent was heated, where precipitation was involved, in order to obtain coagulation effects simulating the hot process described in my Patent 2,681,885 and copending application S. N. 361,251. These data were collected after a single pass through the cathode compartment of the cell with no recycling of concentrated boiler water. In order to obtain data on boiler drum concentrations, recycling of hot concentrated boiler water through the electrolytic cell for heating effect was included. Steam was generated at approximately atmospheric pressure, and the condensate was collected at five times the volume of the boiler drum. No condensate was returned to the recycling system. The following examples further illustrate the tests conducted and the results obtained:

EXAMPLE ONE

The blended supply water from the two wells having the analysis given above, was run through a treating system as shown in Fig. 1, except that all of the water was diverted past the cation exchange unit and was treated directly in the cathode compartment of the electrolytic cell. After passing through the cathode compartment of the cell, the treated water had a pH of 9.6, a hardness ($CaCO_3$) of 62 p. p. m., a bicarbonate content of 40 p. p. m., a sodium content of 33 p. p. m., and a total dissolved solids content of 210 p. p. m. Although the quality of the water had been improved, it did not meet boiler feed water requirements. The pH value of 9.6 is lower than desirable, and the hardness constituent of 62 p. p. m. would indicate a tendency toward scale formation in the boiler. The water so treated was then passed into the boiler and the system was operated by the hot boiler water recycle method, including the electrolytic cell as described above. The concentrated boiler water was then analyzed for total dissolved solids. The total solids content of 378 p. p. m. in the boiler water concentrate was low, but was partially due to precipitation of hardness within the boiler drum. An examination of the boiler drum after the test run definitely disclosed scale formation on the heating surfaces. Thus, on the low-sodium, low-bicarbonate-content hard water, the electrolytic cell treatment alone was not completely adequate.

EXAMPLE TWO

Water from the same supply, having the analysis given above, was run through a pretreating system as shown in Fig. 1, with 100% of the supply passing through the cation exchange unit 14, which in this instance contained a zeolite operating on a sodium cycle. The effluent from the sodium zeolite unit had a pH of 8.3, a hardness ($CaCO_3$) of 8 p. p. m., a bicarbonate content of 185 p. p. m., a sodium content of 137 p. p. m., and a total dissolved solids content of 410 p. p. m. The polyvalent metal ions originally present had been substantially replaced by sodium ions. This effluent was then treated in the cathode compartment of the electrolytic cell, and the effluent therefrom had a pH of 10.4, a hardness ($CaCO_3$) of 4 p. p. m., a bicarbonate content of 85 p. p. m., a sodium content of 142 p. p. m., and a total dissolved solids content of 400 p. p. m. Treated water from the cell was then passed into the boiler which was operated on a hot boiler water recycle system, as before, and analysis of the concentrated boiler water showed a total dissolved solids content of 1140 p. p. m. It will be noted that, as a result of the treatment in the sodium zeolite exchange unit, the sodium content supplied to the water by ion exchange with the hardness components was in excess of the amount required to give the desired pH rise in the cathode compartment of the cell. The catholyte effluent, however, was free from suspended solids, and no additional settling or filtration following the cell was required. The total dissolved solids content of the boiler drum concentrate, 1140 p. p. m., while appearing relatively high, is considerably lower than would have been obtained had soda ash or sodium hydroxide been directly added to the raw water to produce the desired alkalinity. Examination of the boiler drum after the test run disclosed no scale formation.

EXAMPLE THREE

In a further test, raw water, having the analysis given above, was treated in a system as shown in Fig. 1, with 50% of the raw water passing through the cation exchange unit 14 operating on the sodium cycle and 50% of the water being diverted past this unit and commingled with the treated portion prior to passing into the mixing compartment of the electrolytic cell. The blended water had a pH of 7.8, a hardness ($CaCO_3$) of 112 p. p. m., a bicarbonate content of 184 p. p. m., a sodium content of 79 p. p. m., and a total dissolved solids content of 405 p. p. m. This water, after electrolytic treatment in the cathode compartment of the cell, had a pH of 10.4, a hardness ($CaCO_3$) of 4 p. p. m., a bicarbonate content of 50 p. p. m., a sodium content of 95 p. p. m., and a total dissolved solids content of 360 p. p. m. The test run was continued as before, with water so treated being passed to the boiler, and the system further operated on a hot boiler water recycle process. Analysis of the boiler water showed a total dissolved solids content of 800 p. p. m. It will be noted that about 50% of the hardness constituents were removed by the sodium exchange treatment and the remaining 50% substantially all precipitated in the cathode compartment of the cell by the electrolytic treatment. By so operating, the cell effluent from the combined treatment has a lower total dissolved solids content than where all of the water is passed through the ion exchange unit as in Example 2. The bicarbonate content is also lower than that in the cell effluent where pretreatment of the total water supply in the sodium zeolite unit has been effected. Both the sodium content and the bicarbonate content, however, were sufficient to produce the desired alkalinity in the cell, and to precipitate the remaining hardness components as carbonates therein. The boiler drum concentrate had a desirable low total dissolved solids content which therefore would require a smaller percentage of boiler blowdown during continuous operation than would otherwise be required. Examination of the boiler drum after the test run disclosed no indication of scale formation.

EXAMPLE FOUR

In a further test, raw water from the same supply as utilized before was run through the system illustrated in Fig. 1 with 25% of the supply passing through the cation exchanger 14 operating on the sodium cycle, and the remaining 75% of the raw water bypassing this unit and being commingled with the effluent therefrom. The blended mixture was then passed through the cathode compartment of the electrolytic cell. The blended mixture, prior to entry into the cell, had a pH of 7.6, a hardness component ($CaCO_3$) of 165 p. p. m., a bicarbonate content of 178 p. p. m., a sodium content of 67 p. p. m., and a total dissolved solids content of 400 p. p. m. After passage through the electrolytic cell, the pH of the water was raised to 10.2, the hardness ($CaCO_3$) was 14 p. p. m., the bicarbonate content 35 p. p. m., the sodium content 75 p. p. m., and the total dissolved solids 300 p. p. m. The water so treated was then passed to a boiler system operated by a hot recycle method as before. The boiler drum water analysis showed a total dissolved solids content of 620 p. p. m. These results appear to indicate that the 25% sodium ion exchange treatment was too low to provide sufficient sodium ions to increase the alkalinity in the cell to the extent required to completely precipitate hardness components. However, it is to be noted that the boiler was operated at atmospheric pressure. When concentrate from a boiler drum operating at a higher pressure, as, for example, over 100 lbs. p. s. i., is recycled through the electrolytic cell, the pH in the cell is raised to a higher value, and hardness in the cell effluent is reduced to practically zero. The process would, therefore, appear to be particularly advantageous for operation of high-pressure boilers. Utilizing the proportions given in this example, advantages are obtained in low bicarbonate content and relatively low total dissolved solids in the boiler feed. Examination of the boiler drum after the test run disclosed no scale formation, but a small amount of sludge accumulation.

EXAMPLE FIVE

In a further test, a system as shown in Fig. 1 was utilized except that the cation exchange unit contained hydrogen zeolite, and 100% of the raw water was passed through this unit prior to introduction into the electrolytic cell. The effluent from the hydrogen zeolite unit had a pH of 2.7, a hardness ($CaCO_3$) of 10 p. p. m., a bicarbonate content of zero, and a total dissolved solids content of 88 p. p. m. Treatment in the electrolytic cell raised the pH to a value of 8.0, further reduced hardness components to 7 p. p. m., and resulted in an effluent having a total dissolved solids content of 106 p. p. m. This water, when introduced into a boiler operating on a hot recycle system in combination with the electrolytic cell, provided a boiler water concentrate having a total dissolved solids content of 220 p. p. m. From this test it will be noted that the pH of the catholyte effluent was raised to above neutral, but the hardness components were not completely removed. The total dissolved solids were held at a low figure in the recycling system by virtue of acid ion migration into the anolyte waste solution. The pH of the recycled water in the boiler test was slightly above 9. Examination of the boiler drum after the test run disclosed no scale formation, but at the relatively low pH it would appear that there would be some tendency toward corrosion in the boiler unless dissolved oxygen were completely removed. Pretreatment of the water with hydrogen ion exchange material is somewhat less economical than pretreatment with sodium ion exchange material, particularly when natural zeolites are used for the latter purpose. However, the low total dissolved solids and complete removal of bicarbonate constituent provide attractive features of this combination for uses other than for boiler water.

EXAMPLE SIX

In this test a boiler water treatment was utilized in accordance with the system shown in Fig. 2, with 50% of the raw water passing through hydrogen zeolite exchanger 106 operating on the hydrogen cycle, and the other 50% of the raw water passing through sodium zeolite exchanger 126 operating on the sodium cycle. All of the effluent from the two units was commingled, as in pipeline 116, prior to passage into the electrolytic cell. The blended water from the two units had a pH of 6.5, a hardness component ($CaCO_3$) of 9 p. p. m., a bicarbonate content of 35 p. p. m., a sodium content of 73 p. p. m., and to total dissolved solids content of 282 p. p. m. After electrolytic treatment, the pH of this water was raised to 10.6. The hardness components were reduced to 3 p. p. m., the bicarbonate content was 25 p. p. m., the sodium content, 98 p. p. m., and the total dissolved solids 224 p. p. m. Water so treated was then run to the boiler, and the system was operated by the hot recycle process. The concentrated boiler water showed a total dissolved solids content of 365 p. p. m. It will be noted from the results of this test that the mixture entering the electrolytic cell contained sufficient sodium to bring about the desired pH rise in the cathode compartment. The bicarbonate content and the total dissolved solids content are relatively low, and the effluent from the cell constitutes a very desirable boiler feed supply. The total dissolved solids content of the concentrated boiler water is considerably lower than any other blends of partially treated sodium ion exchange effluent and raw water. Examination of the boiler drum after the test run disclosed no scale formation.

The results of Examples 1 through 6 are summarized in the following table:

*Comparative performance data*

[Chemical analysis in p. p. m.]

|  | pH | Hardness ($CaCO_3$) | Bicarbonate | Sodium | T. D. S |
|---|---|---|---|---|---|
| Raw Water Supply (All Examples) | 7.5 | 230 | 180 | 30 | 395 |
| Example I: |  |  |  |  |  |
|   Electrolytic Treatment Only | 9.6 | 62 | 40 | 33 | 210 |
|   Boiler Drum Concentration |  |  |  |  | 378 |
| Example II: |  |  |  |  |  |
|   100% Sodium Zeolite Supply | 8.3 | 8 | 185 | 137 | 410 |
|   Electrolytic Treatment | 10.4 | 4 | 85 | 142 | 400 |
|   Boiler Drum Concentration |  |  |  |  | 1,140 |
| Example III: |  |  |  |  |  |
|   50% Sodium Zeolite Supply | 7.8 | 112 | 184 | 79 | 405 |
|   Electrolytic Treatment | 10.4 | 4 | 50 | 95 | 360 |
|   Boiler Drum Concentration |  |  |  |  | 800 |
| Example IV: |  |  |  |  |  |
|   25% Sodium Zeolite Supply | 7.6 | 165 | 178 | 67 | 400 |
|   Electrolytic Treatment | 10.2 | 14 | 35 | 75 | 300 |
|   Boiler Drum Concentration |  |  |  |  | 620 |
| Example V: |  |  |  |  |  |
|   100% Hydrogen Zeolite Supply | 2.7 | 10 | 0 |  | 88 |
|   Electrolytic Treatment | 8.0 | 7 | 0 |  | 106 |
|   Boiler Drum Concentration |  |  |  |  | 220 |
| Example VI: |  |  |  |  |  |
|   50% H. Z.-S. Z. Supply | 6.5 | 9 | 35 | 73 | 282 |
|   Electrolytic Treatment | 10.6 | 3 | 25 | 98 | 244 |
|   Boiler Drum Concentration |  |  |  |  | 365 |

Each of the treatments which involved preliminary treatment of the raw water with a cation exchange material prior to introducing such water into the electrolytic cell provided a more suitable boiler water feed than did the effluent from the electrolytic cell where no such pretreatment had been utilized. The combined effects of cation exchange and electrolytic cell treatment also result in the advantage of fuel economy in a boiler feed water treating system, as well as simplifying operating control. By utilizing a sodium zeolite unit for pretreatment of all of the raw water, as in Example II, a substantial reduction in both carbonate and noncarbonate hardness is realized, so that the effluent from the electrolytic cell is free of suspended solids, and, at the same time, sufficient sodium ions are introduced into the water so that the pH of the effluent from the cell is raised to a point where silica, if present, may be held in solution. By diverting part of the raw water around the sodium zeolite unit, as in Examples III and IV, in such proportions that the confluent mixture in the electrolytic cell has just sufficient reduction in hardness components and addition of sodium ions to effect precipitation of the remaining hardness with the bicarbonate content of the water and produce the desired alkalinity, a final product of low dissolved solids content is produced. The load on the exchange unit is kept at a minimum in this method of operation, and, moreover, by precipitation of part of the hardness components in the cell a substantial amount of silica is removed from the water through combination, absorption, or occlusion in the precipitate formed.

The combination of the hydrogen zeolite unit and sodium zeolite unit with the electrolytic cell, as described in connection with Fig. 2 and Example VI, provides a means for obtaining a final product of lower mineral content than can be obtained by the combination of a sodium zeolite unit alone with the electrolytic cell. Sodium and/or potassium constituents may be reduced to the minimum required to produce the desired pH rise, and the bicarbonate alkalinity may be substantially removed. The advantages of such a combination reside in lower boiler blowdown and high steam quality. In all of these combinations, the provision of an electrolytic cell in the treating system provides an economic and convenient means for pH control through the formation of alkali metal hydroxides in the cathode zone, and no chemical addition to the water is required other than that supplied by the exchange units. The electrolytic cell further provides means for substantial reduction of carbon dioxide gas and dissolved oxygen. The dissolved oxygen, for example, may be reduced from about 9 p. p. m. to less than 2 p. p. m. The carbonic acid constituents, as well as anions such as sulfates and chlorides, are materially reduced. By utilizing the electrolytic cell with the cation exchangers, the load on such equipment as degasifiers or deaerators is at least materially reduced, and in most cases, when proper proportioning is maintained prior to the electrolytic cell treatment, such equipment may be entirely eliminated. It will be understood that the electric power required by the electrolytic cell will vary considerably, depending upon the nature of the raw water, the quality of the final product desired, and the quantity and concentration of the boiler drum water returned to the electrolytic cell for heating and reaction purposes. It has been found, however, that the quantity of electric power required will usually be less than 1 kwh. per 1000 gallons of raw make-up water, when optimum conditions have been established in accordance with the system of this invention.

It will be understood that numerous variations in the arrangement and flow diversions of the water treatment system disclosed herein may be utilized. The selection of the particular manner of pretreatment is dependent on the nature of the raw water and upon the desired quality of the desired product for a specific situation.

The apparatus of the present invention contemplates the use of automatic rate-of-flow controls for properly controlling the proportioning of the various streams directed to the ion exchange units and electrolytic cells. It is further contemplated that absorbent resin beds or other means for removal of silica may be included in the treating system of the invention when substantially complete removal of this constituent is indicated as desirable. Such units will usually follow the cation exchangers and precede the electrolytic cell. However, silica absorption units may follow the electrolytic cell if so desired. It is also contemplated that degasifiers or deaerators or aerators in some instances may be utilized in combination to provide a desired steam quality, such units usually following the electrolytic cell. Since these means are well known, and form no part of the present invention, they have not been described in detail.

I claim:

1. A process for treating water containing a total hardness content in excess of its bicarbonate content, comprising: replacing at least some of the hardness-producing cations in said water with sodium ions by ion exchange with sodium zeolite so that the bicarbonate content of the resultant water is at least equal to the remaining total hardness content of said water, and subjecting said treated water to electrolytic action in the cathode compartment of an electrolytic cell to alkalize said water and precipitate at least part of any remaining hardness-producing cations as carbonates.

2. A process for treating water containing hardness-producing cations and having a relatively high bicarbonate content, comprising: flowing a substantial portion of said water through a hydrogen zeolite exchanger to replace metal cations with hydrogen and thereby form acids, flowing another substantial portion of said water through a sodium zeolite exchanger to replace hardness cations in said water with sodium ions, introducing at least a portion of the sodium zeolite effluent water into the acid effluent water from the hydrogen zeolite to reduce the bicarbonate content of the water through formation of carbon dioxide, and subjecting the resultant water to electrolytic action in the cathode compartment of an electrolytic cell to raise the alkalinity thereof and remove dissolved and occluded gases.

3. The process of claim 2, wherein a portion of the effluent water from the sodium zeolite exchanger is introduced into the acid effluent water from the hydrogen zeolite exchanger to provide a pH no higher than about 3.7 in the resultant mixture and wherein the remaining portion of the effluent water from the sodium zeolite exchanger is mingled with the acid mixture prior to the electrolytic action.

4. The process of treating boiler feed water in an electrolytic diaphragm cell having anode and cathode compartments, comprising: flowing at least a substantial portion of hard make-up water containing a total hardness content in excess of its bicarbonate content through a zeolite exchanger operating on the sodium cycle to replace hardness-producing cations with sodium ions so that the bicarbonate of the resulting water is at least equal to the total hardness content of said water, simultaneously flowing said water and highly alkaline concentrated boiler water into said cathode compartment, passing current from said anode to said cathode to alkalize said waters and precipitate at least part of any remaining hardness-producing cations as carbonates and separating said alkalized water from said precipitate, flowing said separated water to a boiler wherein it is concentrated, and flowing a portion of said concentrated water to said cathode compartment.

5. In a process for treating boiler water wherein a hard, boiler make-up water containing bicarbonates and alkali metal ions is subjected to electrolytic action in the cathode compartment of an electrolytic cell to precipitate at least part of the hardness components as carbonates in the alkaline catholyte and the total hardness in said water is in excess of the bicarbonate content, the step comprising adjusting the ratio of hardness components to bicarbonate content in the make-up water by passing at least a substantial portion of said make-up water to less than about 1.0 through sodium zeolite exchanger prior to subjecting said make-up water to electrolytic action to exchange hardness-producing cations for sodium ions and thereby insure substantially complete hardness removal by the combined ion exchange and electrolytic action.

6. A process for treating a hard water having a low alkali metal content and a total hardness content in excess of its bicarbonate content, comprising: passing a sufficient portion of said water through a sodium zeolite exchanger to provide in the resultant combined streams a sodium content in excess of 50 parts per million and a total hardness content less than the bicarbonate content, and subjecting the resultant water to electrolytic action in the cathode compartment of an electrolytic cell to reduce the corrosive anion content by anion migration, raise the alkalinity of the water to a pH of at least about 10.2, and precipitate substantially all of the remaining hardness constituents.

7. Apparatus for treating water, comprising: the combination of a sodium zeolite exchanger, a hydrogen zeolite exchanger, means for passing the water to be treated through said exchangers in parallel flow in selected proportions, means for combining a selected proportion of the water treated in the sodium zeolite exchanger with the water treated in the hydrogen zeolite exchanger, an electrolytic diaphragm cell having anode and cathode compartments, means for passing the combined water from the zeolite exchangers to the cathode compartment of said cell, means for passing any uncombined water from the sodium zeolite exchanger to the cathode compartment of said cell, and means for withdrawing electrolytically treated water from the cathode compartment of the cell.

8. The apparatus of claim 7, wherein means are provided for bypassing both ion exchange units whereby a selected portion of the water to be treated may be passed directly to the electrolytic cell.

References Cited in the file of this patent

UNITED STATES PATENTS

| | | |
|---|---|---|
| 2,681,885 | Briggs | June 22, 1954 |
| 2,688,572 | Warshaw | Sept. 7, 1954 |

FOREIGN PATENTS

| | | |
|---|---|---|
| 1,046,296 | France | July 8, 1953 |